March 8, 1932.  R. T. HURLEY  1,848,952
MEASURING INSTRUMENT
Filed Feb. 26, 1929
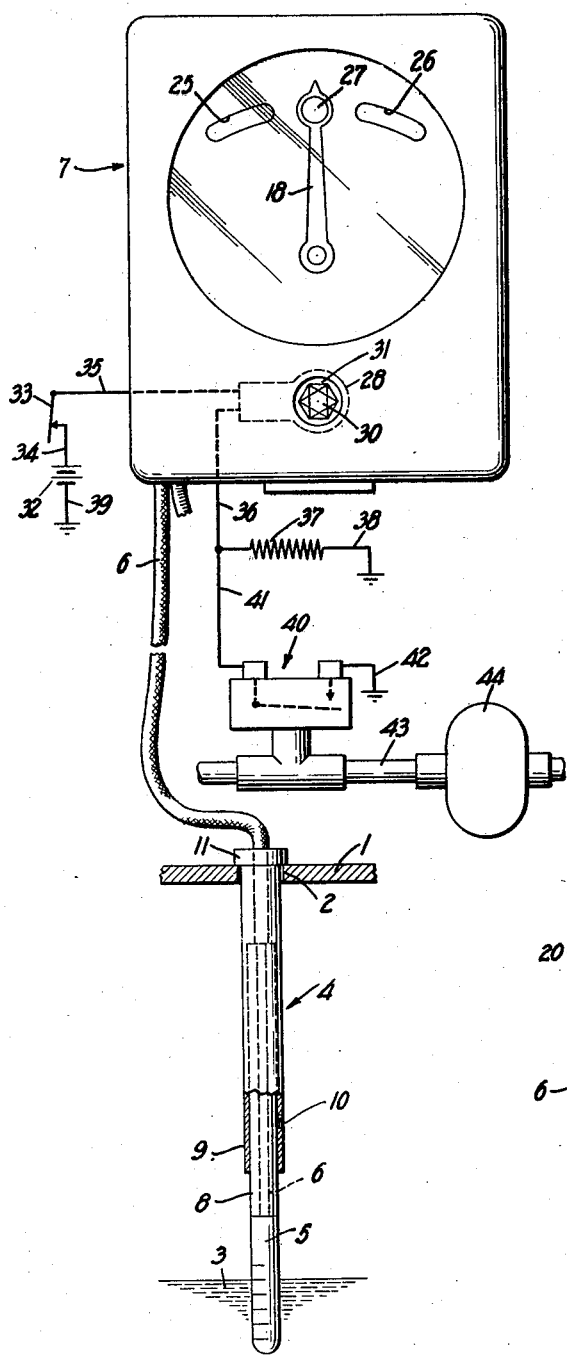
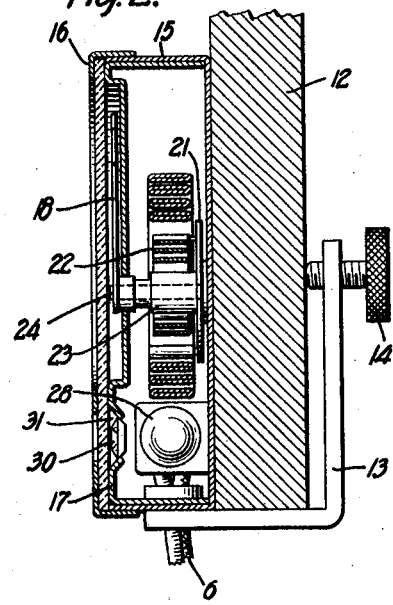
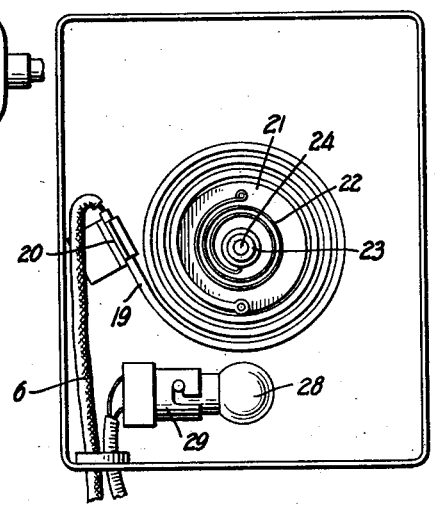
INVENTOR
Roy T. Hurley.
BY Moses & Nolte
ATTORNEYS Patented Mar. 8, 1932

1,848,952

UNITED STATES PATENT OFFICE

ROY T. HURLEY, OF DOBBS FERRY, NEW YORK, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

MEASURING INSTRUMENT

Application filed February 26, 1929. Serial No. 342,825.

This invention relates to indicating means designed for informing the driver of a motor vehicle of operating conditions affecting the motor, and for warning him when conditions occur which are dangerous to continued operation.

It is an object of the invention to secure an indication of the thermal condition of the motor from the temperature of the oil in the crank case, and this without the necessity for drilling the crank case or otherwise altering the normal construction thereof. On a large proportion of motor vehicles in use at the present time, provision is made of an oil level gauge in the form of a graduated rod which extends through an opening in the upper part of the crank case and dips into the oil. Such rod is provided with an abutment near the upper end thereof for engagement with the exterior of the crank case to arrest penetration of the rod in a predetermined position and thereby enable accurate measurements to be taken. In accordance with an important feature of the invention, provision is made of a combined temperature responsive element and liquid level indicator which may be substituted in this opening of the crank case for use in place of, but in the same manner as, the rod normally provided.

A further feature of the invention relates to the construction of this combined thermometer bulb and oil level indicator in such manner that it can be adjusted in length and thereby rendered adaptable to a wide variety of motors.

The temperature indicating means may be in the form of a usual distance type thermometer having an indicating portion, in view of the driver, adapted to be operated by pressure transmitted through a capillary tube from the thermometer bulb.

A further object of the invention relates to the provision of means for illuminating the temperature indicating means and for further affording a means for warning of failure of oil pressure.

To this end provision is made of an electric bulb within the casing of the temperature indicating instrument which is arranged both to indirectly illuminate the temperature indicating part of the instrument and to shine directly through an opening in the face of the instrument. Provision is further made of an electric circuit controlled by the ignition switch and including a resistance in series with the light filament for causing the light to glow dimly when the motor is operating normally. In order to enable the light to serve as a warning of low oil pressure, provision is made of a low resistance contact device controlled by the oil pressure and adapted to form a path to ground in parallel with the resistance referred to, the arrangement being such that when the oil pressure falls dangerously low, the resistance through that portion of the circuit external to the light filament is greatly reduced so that the light is caused to glow brilliantly.

Other objects and advantages will hereinafter appear.

In the drawings forming part of this specification:

Figure 1 is an elevation, partly in section and partly diagrammatic, of an organization embodying features of the invention;

Figure 2 is a longitudinal, sectional elevation showing the indicator portion of the instrument of Figure 1; and Figure 3 is a front elevation of the indicator portion of the instrument with the cover plate and dial plate removed.

In the illustrative form of the invention disclosed by the drawings, the crank case 1 of a vehicle motor is shown provided with the usual opening 2 for receiving an oil level indicator adapted to dip into the oil 3 in the bottom of the crank case. As shown herein, provision is made of an oil level indicator 4, which indicator is, however, of novel construction. The indicator comprises a bulb 5 which forms the temperature responsive element of a distance type thermometer and is also provided with graduations for indicating the level of the oil in the crank case. The bulb 5 communicates with the usual capillary tube 6 which extends to the indicating portion 7 of the instrument to operate the latter in response to changes of temperature of the bulb 5. A tube or sleeve 8 surrounds the capillary tube 6 and is fixed to the bulb 5 in any suitable manner as by brazing. A larger tube or sleeve 9 surrounds the tube 8 and may be secured in fixed relation to the tube 8 by a set screw 10 threaded through the wall of tube 9 into binding engagement with tube 8. The tube 9 is provided with an abutment member or collar 11 at its upper extremity which is large enough to completely cover the opening 2 and rest upon the outer surface of the crank case 1. It will be seen that the oil level indicator is suspended by the collar 11, and that it may be adjusted in length to adapt it for application to different vehicles by partially withdrawing the set screw 10, relatively moving the tubes 8 and 9 longitudinally to secure the desired effective length of the gauge, and then tightening the set screw 10. The liquid level gauge normally dips into the oil, and hence the bulb 5 is always properly located for taking the temperature of the oil.

The indicating part of the instrument is illustrated herein as secured upon the front of the dashboard 12 by means of a bracket 13 which extends rearwardly from the lower portion of the instrument casing, and thence upwardly behind the dashboard, and a knurled finger screw 14 threaded through the upwardly extending leg of bracket 13 into engagement with the back of the dashboard. The indicating instrument comprises a rear cup-shaped casing member 15 and a front casing member 16. Within the casing provision is made for a further frame or casing member 17 which serves also as the dial of the instrument. The temperature indicating element or pointer 18 and the operating means therefor are of usual construction. The capillary tube 6 enters the casing through the lower wall thereof and communicates with the outer fixed end of a Bourdon coil 19 which is secured in a bracket 20. The inner end of the Bourdon coil is secured to a rotatable center plate 21, and the center plate is in turn connected through a coiled bi-metallic compensating spring 22 to a shaft 23 which carries the indicating element 18. The center plate 21 and the shaft 23 are journaled upon a center post 24 fast to the casing member 15.

The member 17 has a cup-shaped depression in its front face in which the indicating element or pointer 18 operates, and this depressed portion is provided with slots 25 and 26 through which light from the interior of the instrument may pass. The pointer 18 may be provided with a translucent disc 27 adapted to be carried in front of the slot 25 when the operating temperature is abnormally low and in front of the slot 26 when the operating temperature is abnormally high. The light shining through this translucent disc renders the indicator conspicuous, and thereby calls attention to abnormal operating conditions.

For the purpose of providing interior illumination for the instrument and of further providing a warning indicator when the oil pressure is dangerously low, provision is made of an electric bulb 28 mounted in a socket 29 in the lower portion of the casing. The light from this bulb shines indirectly through the slots 25 and 26 and also shines through a glass jewel 30 mounted in an opening 31 in the casing member 17 directly in front of the light. An aligned opening is provided in the casing member 16 in front of the jewel 30.

In order that this light may be effective to provide illumination at all times when the motor is in operation it is arranged to be connected with the battery 32 by the ignition switch 33. The light circuit comprises a conductor 34 from one side of the battery to the ignition switch 33, a conductor 35 to one terminal of the light bulb, and a conductor 36, resistance 37 and conductor 38 which always connect the other terminal of the light bulb to ground. The battery is always grounded at one side thereof through a conductor 39. With the circuit as thus far described, it will be seen that the turning on of the ignition switch will cause the electric light bulb to be energized. Since the resistance 37 is in series with the light bulb, however, the voltage drop across the light bulb will necessarily be cut down by this resistance and the light filament will be caused to glow dimly.

Provision is further made for utilizing the same light bulb and a considerable portion of the same electric circuit for causing the light filament to glow brightly when the oil pressure is dangerously low. To this end a switch 40, adapted to be closed by a drop in the oil pressure but to be held open whenever the oil pressure is normal, is connected by means of conductors 41 and 42 in parallel with the resistance 37. Since the resistance of the elements 40, 41 and 42 is low as compared with 37, the closing of the switch greatly increases the voltage drop across the filament of the light 28, and hence causes the light to glow brightly. The switch device 40 is shown connected in a conduit 43 of the oil system at the suction side of the oil pump and at a short distance from the oil pump. The switch device may be of the same construction as that disclosed in the pending application of Herman Schlaich, Serial No. 254,446, filed February 15, 1928, for warning device for pumping systems, and will not, therefore, be described herein.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

1. The combination with a crank case having an opening in the top thereof, of a combined thermometer and oil level gauge comprising a temperature responsive element having graduations marked thereon to correspond to the depth or quantity of oil, a temperature indicator remote from the temperature responsive element, a flexible capillary tube connecting the indicator and the temperature responsive element, a substantially rigid tubular suport adjustably carrying the temperature responsive element and surrounding the capillary tube, said support projecting through the opening in the crank case to the exterior thereof whereby the temperature responsive element may be withdrawn at will to take a depth reading, and means for holding said support and element in selectively predetermined relative positions.

2. In combination with an internal combustion engine and the crank case thereof, a support mountable on the crank case, a temperature responsive member provided with depth indicating markings carried by said support and extending from said support into the body of oil in the bottom of the crank case, a temperature indicator remote from the oil in the crank case, and a connection between the temperature responsive member and indicator, said member being adjustable on the support into predetermined positions relative to the bottom of the crank case and freely removable from and insertable into the crank case without disturbing said predetermined positions.

In testimony whereof I have affixed my signature to this specification.

ROY T. HURLEY.